United States Patent
Sample, Jr. et al.

[15] 3,693,719
[45] Sept. 26, 1972

[54] PROCESS FOR PARAFFIN REMOVAL FROM HYDROCARBON-BEARING FORMATIONS

[72] Inventors: Thomas E. Sample, Jr.; Jack F. Tate, both c/o Texaco Inc., P.O. Box 425, Bellaire, Tex. 77401

[22] Filed: Nov. 2, 1970

[21] Appl. No.: 86,242

[52] U.S. Cl. ................................. 166/304
[51] Int. Cl. ....................... E21b 43/00, E21b 43/25
[58] Field of Search...... 166/304, 305, 273, 274, 270, 166/268, 265–267; 252/8.3, 8.55 B, 8.55 D

[56] References Cited

UNITED STATES PATENTS

| | | | |
|---|---|---|---|
| 2,711,392 | 6/1955 | Irwin | 166/304 UX |
| 3,275,552 | 9/1966 | Kern et al. | 252/8.55 B |
| 3,402,770 | 9/1968 | Messenger | 252/8.55 B |
| 2,699,832 | 1/1955 | Allen | 166/304 |

Primary Examiner—Stephen J. Novosad
Attorney—Thomas H. Whaley and Carl G. Reis

[57] ABSTRACT

Solid paraffin-like hydrocarbon materials derived from petroliferous fluids which have been deposited in hydrocarbon-bearing formations are removed by introducing into the formation in the vicinity of the well bore a hydrolyzable, aprotic, halogenated organic material, such as allyl chloride, whereby the said paraffin-like hydrocarbon material is removed, and the permeability and porosity of the formation and production of hydrocarbons therefrom is increased, the well is returned to production and the hydrolyzable, aprotic, halogenated organic compound containing the dissolved or peptized paraffin is removed from the well and conducted to a vessel containing water or a base dissolved in water.

6 Claims, 6 Drawing Figures

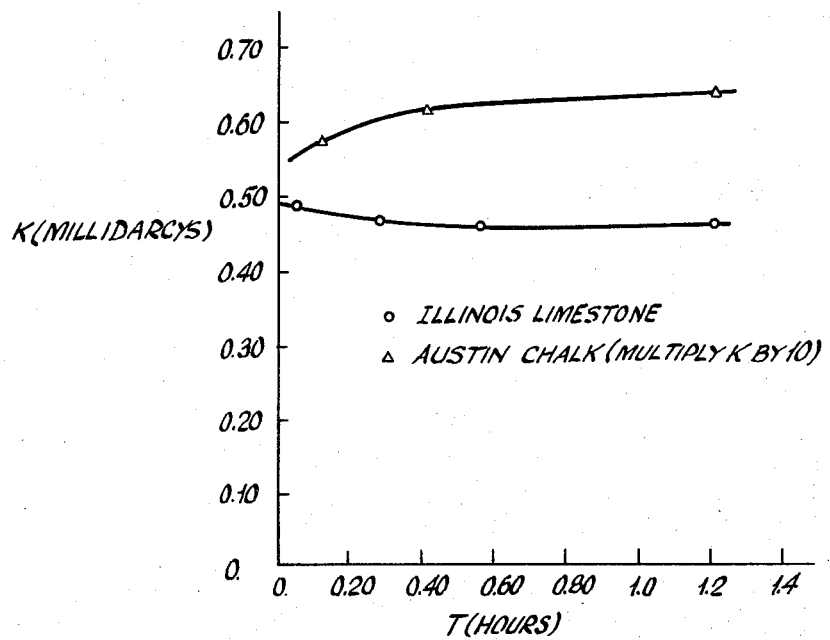
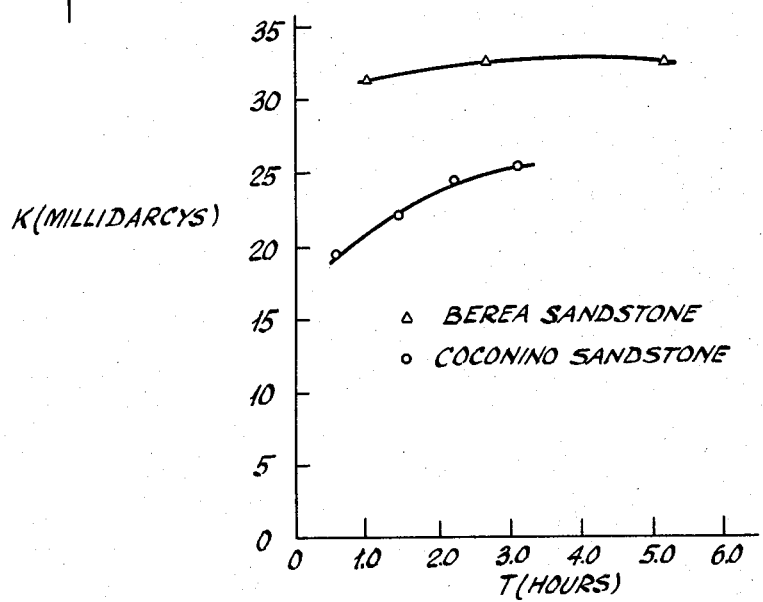

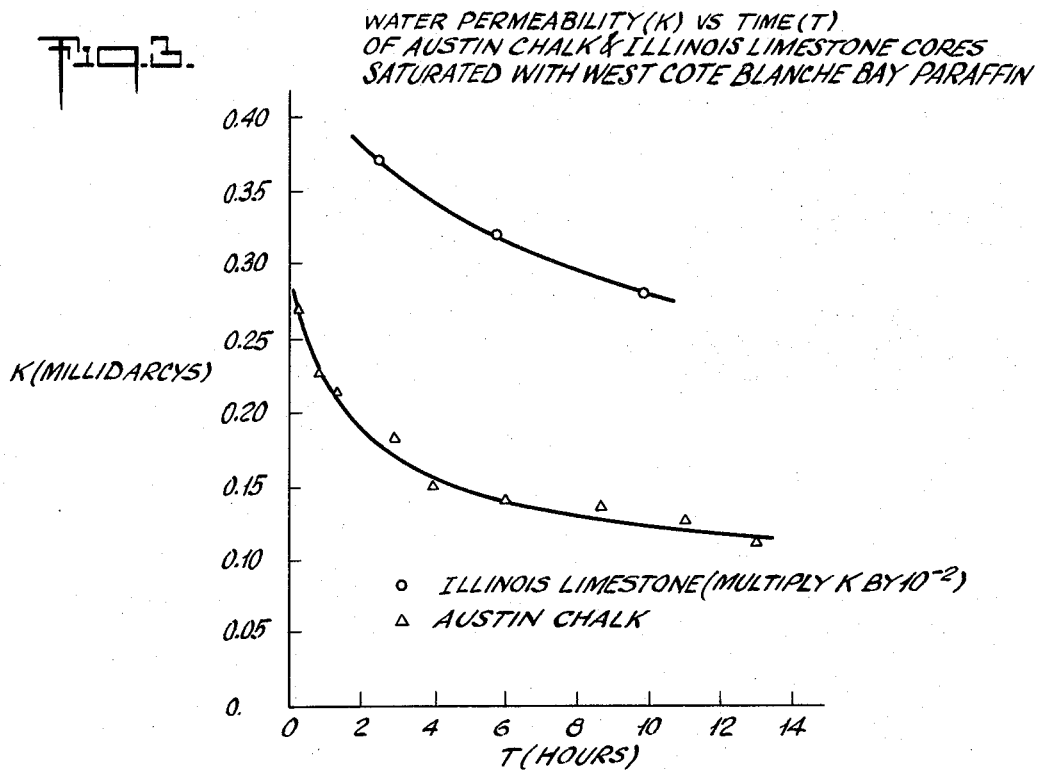
Fig. 3. WATER PERMEABILITY (K) vs TIME (T) OF AUSTIN CHALK & ILLINOIS LIMESTONE CORES SATURATED WITH WEST COTE BLANCHE BAY PARAFFIN
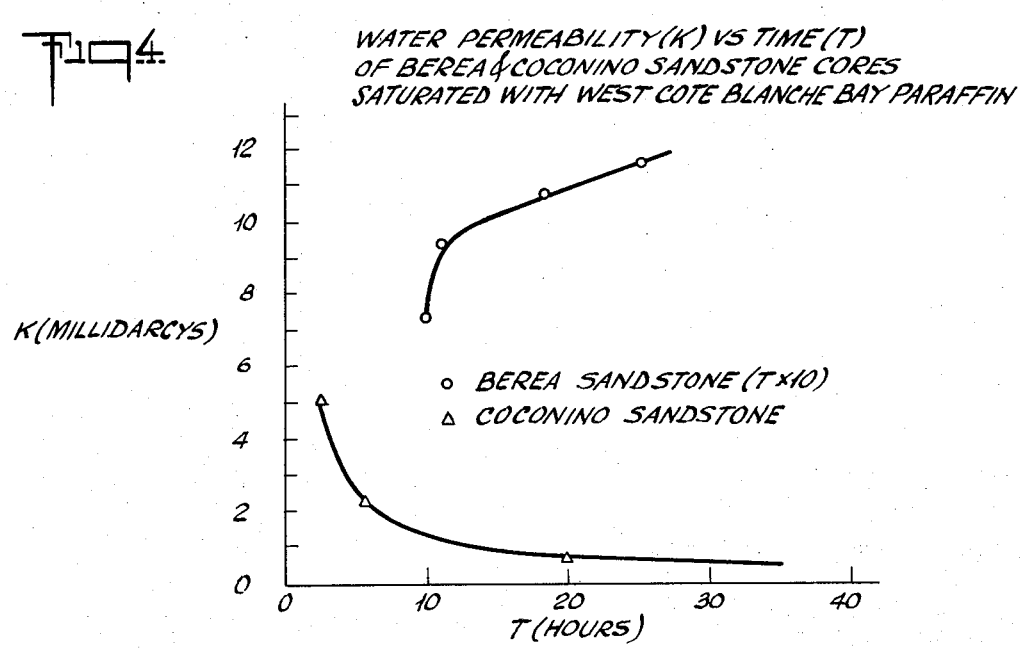
Fig. 4. WATER PERMEABILITY (K) vs TIME (T) OF BEREA & COCONINO SANDSTONE CORES SATURATED WITH WEST COTE BLANCHE BAY PARAFFIN

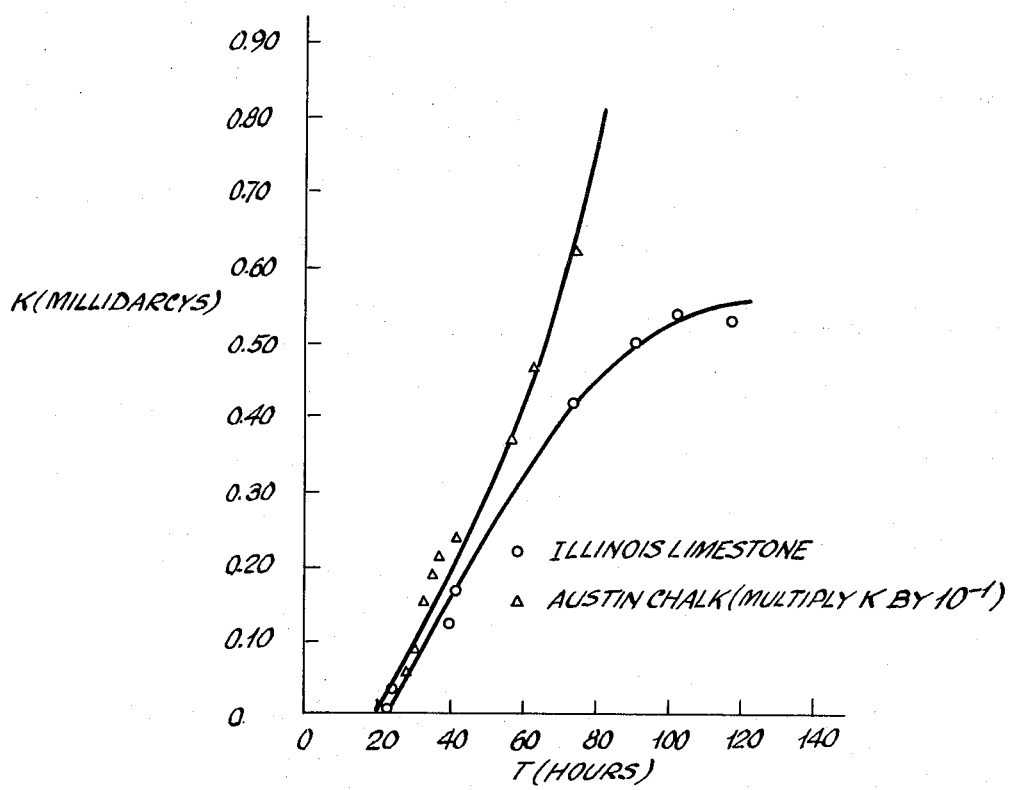
Fig. 5. ALLYL CHLORIDE PERMEABILITY (K) VS TIME (T) OF AUSTIN CHALK & ILLINOIS LIMESTONE CORES SATURATED WITH WEST COTE BLANCHE BAY PARAFFIN
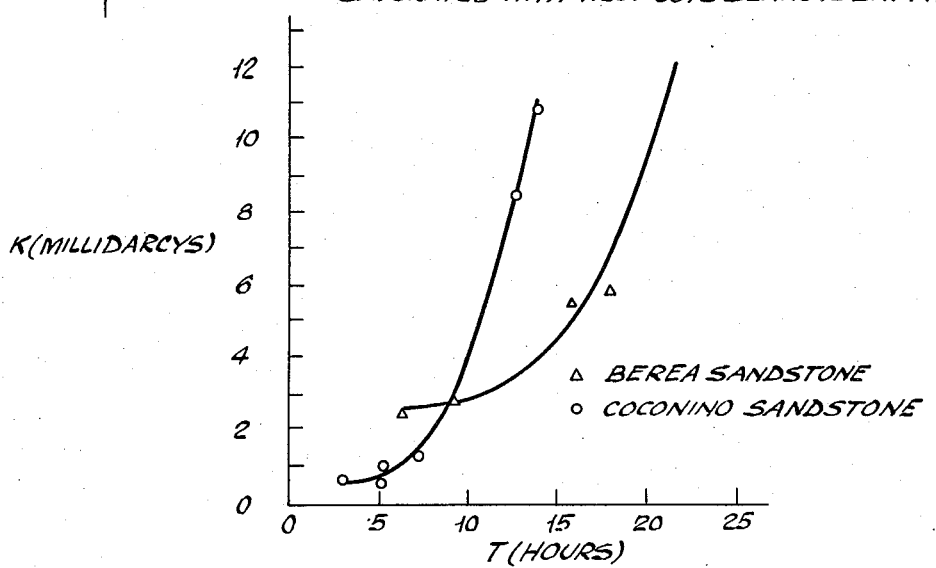
Fig. 6. ALLYL CHLORIDE PERMEABILITY (K) VS TIME (T) OF BEREA & COCONINO SANDSTONE CORES SATURATED WITH WEST COTE BLANCHE BAY PARAFFIN

PROCESS FOR PARAFFIN REMOVAL FROM HYDROCARBON-BEARING FORMATIONS

FIELD OF THE INVENTION

This invention relates to a process of removing paraffin deposits from hydrocarbon-bearing formations. More particularly, the invention relates to a process of removing paraffin deposits utilizing certain hydrolyzable, aprotic, halogenated organic compounds whereby the permeability and porosity of the formation and production of hydrocarbons therefrom is significantly increased.

DESCRIPTION OF THE PRIOR ART

The accumulation and adhesion of solid or semi-solid paraffin-like hydrocarbon materials within a formation matrix is a major problem in the production of crude petroleum in many areas. Such accumulations and adhesion of these so-called "paraffins" within the capillary flow channels of the producing formation can reduce the formation permeability and hence the production rate.

The term "paraffins" as used by those skilled in the art and throughout this specification, refers to any material which is insoluble, sparingly soluble, or undispersible in crude oil under conditions of production. Thus, the paraffin deposit may contain high molecular weight aliphatic hydrocarbons, petroleum resins, asphaltic materials, heavy aromatic hydrocarbons, and mineral matter. The composition of such paraffin deposits varies from one crude oil type to another, from one field to another, from one well to another, in the same field and even at different depths from the same well.

It is believed that several factors are responsible for such a paraffin deposition within the formation matrix near the well bore. The paraffin dissolved or dispersed in the fluid stream may undergo a change of state and precipitate during a drop in temperature or rate of flow. In the course of a water flood, the temperature at the formation base of the producing well may decline, causing deposition. Although a change in temperature is considered a fundamental cause for deposition of paraffin, other factors are thought to contribute to such deposition, among which are alternate coating and draining of oil from a surface, presence of mineral matter, release of the more volatile constituents from the oil as it nears the bore, loss of these volatile constituents from the oil, change in viscosity of the oil, and other conditions which are not fully understood that appear to encourage aggregation of the paraffin present in the oil on the formation surfaces with which the oil comes in contact.

A wide variety of methods have been proposed and used in attempts to overcome the problem of paraffin deposition in the producing formations of oil wells. Although mechanical processes have been utilized in removing such deposits from tanks and pipes they are ineffective and inapplicable in the removal of paraffins deposited within the formation matrix. A variety of solvents, such as those described in U.S. Pat. No. 3,162,601, have been utilized in removing paraffin deposits. In fact, some solvent formulations are known that will react in part with the well fluid to produce heat in addition to the solvent action.

This dissolution of the solid or semi-solid paraffin-like hydrocarbon deposits by organic substances, such as highly-stable, halogenated organic compounds as exemplified by carbon disulfide and carbon tetrachloride has also been employed with success. However, the use of stable halogenated organic compounds is generally prohibited in oil-production because of the risk of their carry-over to the refinery where such materials poison cracking catalysts. Because of its toxicity and extremely low flash and autoignition points, the use of carbon disulfide in oil-production operations is highly restricted, even though it is perhaps the most effective paraffin solvent known.

Accordingly, it is an object of the present invention to provide a method of removing paraffin deposited within the formation matrix at or near the well bore which increases the permeability and porosity of the formation and results in significant improvement in hydrocarbon production therefrom.

Another object of the present invention is to provide a method of removing paraffin deposits in the formation matrix which avoids the risk of carry-over to the refinery of organic cracking catalyst poisons.

SUMMARY OF THE INVENTION

This invention relates to a process for removing paraffin deposited within a hydrocarbon-bearing formation at or near the well bore which comprises contacting the formation with a hydrolyzable, aprotic, halogenated organic compound capable of dissolving or dispersing said paraffin deposits within the formation whereby permeability and porosity of the formation is greatly increased and the production of hydrocarbons therefrom is significantly increased, then removing the hydrolyzable, aprotic, halogenated compound from the well and conducting the mixture of dissolved or peptized paraffin and hydrolyzable, aprotic, halogenated compound to a tank containing water or a base dissolved in water.

BRIEF DESCRIPTION OF THE DRAWING

FIGS. 1 to 6 graphically show the change in permeabilities with respect to time of various paraffin-containing formation cores treated according to the present invention with allyl chloride.

DETAILED DESCRIPTION OF THE INVENTION

In its broadest aspect, the process of the present invention comprises introducing into the formation having deposited therein paraffin-like hydrocarbons a hydrolyzable, aprotic, halogenated organic material in an amount sufficient to dissolve and/or disperse the said hydrocarbon paraffin deposit so as to increase substantially the flow capability of the formation and at the same time improve significantly the production of hydrocarbons therefrom.

This invention is concerned with the removal of paraffin deposit from any formation matrix into which a producing or water-injection well is drilled. The formation matrix may be substantially free of acid-soluble material as are most sandstones, it may be a pure limetone or chalk or it may be a conglomerate of the two. Furthermore, the formation may contain clays or shales as well.

It has been found that certain hydrolyzable, aprotic, halogenated organic materials employed in the method of this invention are capable of dissolving and/or dispersing paraffin. One important advantage of the process of this invention is that these halogenated compounds may be decomposed by reaction with water (in the presence or absence of heat and/or base) subsequent to the dissolution or peptization of the paraffin. This important characteristic of such compounds enables the operator of the process of this invention to avoid carry-over of halogenated organic compounds to the refinery. In addition, such compounds are considerably less toxic, flammable and hazardous in use than the aforementioned carbon disulfide.

Hydrolyzable, aprotic, halogenated materials suitable for the practice of this invention broadly encompass certain halogen-containing organic compounds, both simple and poly-functional, which are sufficiently active to hydrolyze at a finite rate subsequent to dissolution or peptization of the paraffin deposit. Illustrative of the aprotic organic halides useful in practicing this invention are: allylic and propargylic halides, alpha-haloalkyl aryl compounds, etc., and mixtures thereof. Vinyl and aprotic aryl halides are ordinarily not sufficiently susceptible to hydrolysis within the conditions of this invention to be generally useful in its practice.

Examples of organic halogenated compounds suitable for use in the method of this invention include allyl chloride, 1-chloro-2-butene, propargyl chloride, benzyl chloride, benzylidine chloride, etc. Analogous bromides and iodides, providing of course, they are sufficiently stable, may also be employed. Organic fluorides are less suitable as reactants because of their general resistance to hydrolysis.

In one embodiment of this invention, a slug of the aprotic, halogenated material is introduced into the well bore and thereafter into the formation under a pressure equal to or greater than the formation pressure. This slug may then be followed by a subsequently injected drive agent, e.g., water. The size of the slug employed may vary within rather wide limits and will depend on a number of factors including the thickness of the formation, its characteristics and the extent of the formation damage by the paraffin deposition. The duration of the exposure of the paraffin deposits in the formation to the aprotic, halogenated material required will depend on the extent of deposition of the paraffin, its inherent solubility in the aprotic, halogenated material and the tenacity with which the paraffin adheres to the formation. After removal of the paraffin has been effected, the well is returned to production and the aprotic, halogenated material is removed from the well (along with the dissolved or peptized paraffin) and conducted to a tank containing water or a base dissolved in water. In this manner the aprotic, halogenated material is decomposed to an oxygenated organic compound and an inorganic halide prohibiting any carry-over of halogenated hydrocarbon to the refinery, and the paraffin separates from the mixture in the tank.

The following is a description by way of examples of laboratory tests whereby the effectiveness of the present invention has been demonstrated.

In the first series of laboratory tests, paraffin samples were deposited on the inside surfaces of glass vessels, after which a measured volume of allyl chloride was added to each vessel. The vessels were then shaken and allowed to stand overnight. The ability of the allyl chloride to remove the various paraffins from the vessel surfaces and solubilize or disperse them is recorded in Table 1 which follows:

TABLE 1

| Paraffin Sample Source | Result |
| --- | --- |
| North Dayton Field, Texas | d |
| Handy Unit, Texas | s |
| West Cote Blanche Bay, La., Well A | d |
| West Cote Blanche Bay, La., Well B | d |
| Mabee Field, Texas | d |
| Velasquez Field, Colombia | d |
| Cherry Canyon Field, Texas | d |

$d$ = dispersion, removal of adhered paraffin.
$s$ = solution, no particulate matter remaining.

These laboratory tests on a wide variety of paraffin samples show that allyl chloride is an effective agent for solubilizing and dispersing paraffin samples of greatly varying chemical composition and physical properties.

In a second series of laboratory experiments the effectiveness of allyl chloride in removing paraffin present in representative formation cores containing acid-soluble components was demonstrated.

Austin Chalk and Illinois Limestone cores obtained from quarry samples were first cleaned by overnight extraction with benzene in a Soxhlet apparatus. The cores, following drying in a vacuum oven, were allowed to cool in a desiccator and weighed. After encapsulation in a Hassler holder, the permeability of the cores toward water was measured by means of a conventional permeameter.

The cores were removed from the permeameter, and mounted in an oven maintained at a temperature 95° C., in such a way that air could be drawn therethrough. A sample of downhole paraffin taken from a well in the West Cote Blanche Bay Field, La. was simultaneously placed in the oven and allowed to melt. After the paraffin had melted and thermal equilibrium had been established, the molten paraffin was drawn into the cores by application of vacuum provided by a conventional vacuum pump. Vacuum was discontinued when paraffin appeared on the suction side of the cores indicating that saturation of the core had been accomplished. One core so saturated was cross-sectioned for examination by cutting and found to be uniformly saturated with paraffin. The cores were allowed to cool slowly while still under vacuum which procedure permitted the retention of a slight degree of initial permeability in the core. Next, the paraffin-saturated cores were weighed following which the permeability of the saturated cores to water was determined by the same procedure as described above. The effluent was clear indicating no mobile paraffin was removed by mechanical means.

The experimental treatment of the cores were designed to simulate as nearly as possible a formation damaged by paraffin deposition. Accordingly, the paraffin was deposited in a water-saturated core and the allyl chloride treatment carried out on a water-wet core.

In conducting this series of tests, allyl chloride was passed through the cores, displacing the water. The allyl chloride collected was dark colored, almost opaque, at the beginning, becoming progressively clearer and lighter as the volume throughput increased. After permeability measurements were discontinued, the core was vacuum dried to constant weight.

The composition and properties of the downhole paraffin utilized in this series of experiments, which was taken from a well in the West Cote Blanche Bay Field, La., are shown in Table 2 which follows:

TABLE 2

CHROMATOGRAPHIC SEPARATION DATA TZ

| Aliphatic % | Aromatic % | Asphaltene % | Residue after Ignition | Volatile* Material % Original Material |
|---|---|---|---|---|
| 93.3 | 5.5 | 3.9 | 0.00 | 21.5 |
| | m.p. Original °C. | | m.p. Aliphatic Fraction °+C. | |
| | 78 | | 89 | |

*Obtained by heating paraffin to constant weight at 120°C.

The weight of the paraffin extracted by means of the allyl chloride treatment of the cores containing acid-soluble components is set forth in Table 3 which follows:

TABLE 3

TABULATION OF CALCAREOUS CORE DATA

| | Austin Chalk | Illinois Limestone |
|---|---|---|
| Wt. core +paraffin | 15.9293 g. | 19.6814 |
| Wt. core | 14.7370 | 18.9007 |
| Wt. paraffin in core | 1.1923 | 0.7807 |
| Wt. core +paraffin | 15.9293 | 19.6814 |
| Wt. core after allyl chloride treatment | 15.5473 | 19.4592 |
| Wt. paraffin dissolved | 0.3820 | 0.2222 |
| % removal of paraffin by allyl chloride | 32% | 28% |

FIGS. 1, 3 and 5 show the change in permeabilities of the calcareous cores with the time of the allyl chloride treatment. The permeability values shown in these figures were calculated from the flow rate, pressure drop across the core, viscosity and core dimensions using the familiar Darcy equation.

The two experimental criteria employed for evaluating the effect of allyl chloride on the paraffin-saturated cores are (1) core weight change resulting from dissolution or dispersion of the paraffin therein by allyl chloride, and (2) alteration of permeability upon passage of allyl chloride therethrough. Both of these criteria reveal, as shown in the FIG. 5 and Table 3, that allyl chloride is effective in improving formation permeability and in removal of paraffin from cores whose composition simulates a calcareous hydrocarbon-bearing formation damaged by deposition of such paraffin.

Data tabulated in Table 3 indicate that 32 and 28 percent of the paraffin deposited in the cores was removed by passage of the allyl chloride through the Austin Chalk and Illinois Limestone cores respectively. Since the allyl chloride passing through the core when the experiment was terminated was still discolored, it is obvious that an even greater percentage of the paraffin could have been removed had the passage been continued.

Examination of the data set forth in FIGS. 1 and 3 reveals the decrease in permeability resulting from saturation with paraffin. (Average 6.1 md. before saturation with 0.27 md. after saturation for Austin Chalk and 0.45 and 0.43 × $10^{-2}$ md. for Illinois Limestone.) FIG. 3 also shows that a decline in permeability of the paraffin-saturated core to water occurred as water passed through both cores, which may be due to the movement of detached peptized paraffin particles formed when the paraffin cooled.

FIG. 5 shows the increase in permeability in the paraffin-saturated cores which occurs as allyl chloride is passed therethrough. For the Austin Chalk core, the permeability increased from a value of 0.059 to 0.822 md., a 14-fold increase. For the Illinois Limestone core, the permeability increased from a value of 0.18 × $10^{-2}$ to 5.33 × $10^{-2}$ md., a 30-fold increase.

The paraffin sample selected for study in this series of experiments was a representative one as indicated by an analysis of 25 paraffin samples from widely separated locations which revealed that a typical paraffin deposit contains 70–90 percent aliphatics, 5–15 percent aromatics, and up to 15 percent asphaltenes.

In a final series of laboratory experiments the effectiveness of allyl chloride in removing paraffin present in representative sandstone cores was demonstrated.

Experiments identical to those described for the Austin Chalk and Illinois Limestone were carried out on Berea and Coconino sandstone cores. The paraffin was the representative paraffin from West Cote Blanche Bay Field utilized in the second series of experiments. The weight of the paraffin extracted by means of the allyl chloride treatment of the sandstone cores is set forth in Table 4 which follows:

TABLE 4

TABULATION OF SANDSTONE CORE DATA

| | Cocdnino sandstone | Berea sandstone |
|---|---|---|
| Wt. core +paraffin | 18.1434 | 18.8444 |
| Wt. core | 17.7058 | 18.2864 |
| Wt. paraffin in core | 0.4376 | 0.5580 |
| Wt. core +paraffin | 18.1434 | 18.8444 |
| Wt. core after allyl ide treatment | 17.9766 | 18.6282 |
| Wt. paraffin dissolved | 0.1688 | 0.2162 |
| % removal of paraffin by allyl chloride | 38% | 39% |

Data tabulated in Table 4 indicate that 38 and 39 percent of the paraffin deposition in the cores was removed by passage of the allyl chloride through the Coconino and Berea Sandstone cores respectively.

FIGS. 2, 4 and 6 show the change in permeabilities of the sandstone cores with the time of allyl chloride treatment. These permeability values were calculated in the same manner as those set forth in FIGS. 1, 3 and 5.

Examination of the data set forth in FIGS. 2 and 4 reveal the decrease in permeability resulting from saturation with paraffin (Average 26 md., before saturation with 7.5 md. after saturation for Coconino Sandstone and 33 and 7.5 md. for Berea Sandstone.)

FIG. 6 shows the increase in permeability in the paraffin-saturated sandstone cores which occurs as allyl chloride is passed therethrough. For the Coconino Sandstone core, the permeability increased from a value of 0.60 to 10.95 md., and 18-fold increase. For the Berea Sandstone core, the permeability increased from a value of 2.5 md. to 33 md.. a 12-fold increase.

This final series of laboratory experiments demonstrates that the removal of paraffin from sandstone cores is a phenomenon unrelated to the ability of allyl chloride to effect permeability increase by reaction with connate water and subsequent dissolution of the formation matrix by the liberated hydrochloric acid.

What is claimed is:

1. A process for removing solid or semi-solid paraffin-like hydrocarbon materials deposited in a hydrocarbon-bearing formation at or near the well bore, which comprises introducing into the formation under a pressure equal to or greater than the formation pressure a hydrolyzable, aprotic, halogenated organic compound whereby the permeability and porosity of the formation and production of hydrocarbons therefrom are increased, the said hydrolyzable, aprotic, halogenated organic compound being sufficiently active to be decomposed at a finite rate by a hydroxylic material subsequent to dissolution or dispersion and removal of the said paraffin-like hydrocarbon material and wherein the said aprotic, halogenated compound containing the paraffin-like hydrocarbon material dissolved or dispersed therein is removed from the well and subsequently reacted with a hydroxylic material.

2. The process of claim 1 wherein the said aprotic halogenated compound is selected from the group consisting of allylic halides, propargylic halides, alpha-haloalkyl aryl compounds, and mixtures thereof.

3. The process of claim 1, wherein the said aprotic halogenated compound selected from the group consisting of allyl chloride, 1-chloro-2-butene, propargyl chloride, benzyl chloride and benzylidene chloride.

4. The process of claim 1 wherein the said aprotic halogenated compound is allyl chloride.

5. The process of claim 1 wherein the said aprotic halogenated compound is allyl chloride and the said hydroxylic material is water.

6. The process of claim 1 wherein the said aprotic halogenated compound is allyl chloride and the said hydroxylic material is water admixed with base.

* * * * *